Nov. 29, 1966   E. L. HOLT ET AL   3,288,653
ELECTRODE
Filed Jan. 11, 1963
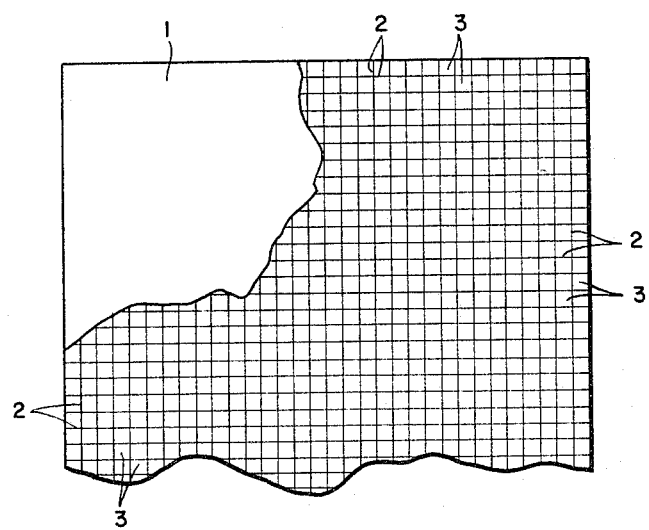
EUGENE L. HOLT
WILLIAM KOBASZ    Inventors
By W. O. J. Heilman
Patent Attorney

United States Patent Office 3,288,653
Patented Nov. 29, 1966

3,288,653
ELECTRODE
Eugene L. Holt, Forest Hills, N.Y., and William Kobasz, Menlo Park, N.J., assignors to Esso Research and Engineering Company, a corporation of Delaware
Filed Jan. 11, 1963, Ser. No. 250,798
3 Claims. (Cl. 136—120)

This invention relates to fuel cells, in particular, this invention relates to a new and improved fuel cell electrode and to methods of producing such electrode, more particularly to an electrode having a finely divided metallic catalyst impressed therein.

Prior to the present invention the preparation of non-porous fuel cell electrodes with many different catalysts was a difficult procedure. The prior procedures gave inconsistent results and were not satisfactory. One of the most common ways of putting the catalysts on the electrode was by electrodeposition. This was unsatisfactory in that may metals could not be electrodeposited and there still remained the necessity of activating the catalyst. The activation techniques were sometimes difficult in that the substrate would dissolve during the activation step. Another procedure used was to coat the electrode with a slurry of the catalyst and then carefully dry the coated electrode. Such electrodes are quite fragile and require a highly skilled operator to prepare them. In the best method to date the catalyst is mixed with a binder, such as powdered Teflon, prior to application to the electrode. The mixture is applied to the electrode and sintered to firmly set the catalyst. By this technique almost any catalyst may be applied to the electrode. However, the heat of sintering deactivates many catalysts and the binder material reduces the electroconductivity of the electrode.

It has now been found that highly active catalytic electrodes can now be produced without the disadvantages of the prior art procedures. By the present invention a metal screen is welded to an electroconductive metal sheet and then a finely divided catalyst is compacted thereon at essentially room temperature. Any of the known catalytic metals may be used as the catalyst in this invention, metals such as the platinum group metals and the transition metals of Group VIII of the Periodic Table.

By the method of the present invention an electrolyte resistant metal screen is welded to an electroconductive metal plate, this base structure is then coated with a moist paste of the catalytic material. The paste is applied at a coverage rate of from 0.1 to 50 mg./cm.$^2$ of superficial electrode area, preferably from 0.2 to 30 and most preferably from 0.5 to 15 mg./cm.$^2$. The moist catalytic paste is then partially dried. The coated electroconductive base is then subjected to a pressure of from about 500 to about 5000 p.s.i., preferably from 200 to 3000 p.s.i.

The metal screen and base plate may be of any metal that is not attacked by the electrolyte. Thus platinum, gold, tungsten, tantalum, silver, iron and nickel are examples of metals that may be used. However, in order to minimize costs, non-noble metals such as tungsten, tantalum, iron or nickel are preferably used. The screen mesh may be from 10 to 200, preferably from 45 to 150.

Referring now to the accompanying drawing, which provides a front view of a simple diagrammatic portrayal of the instant electrode:

There is first shown a metal base plate 1, which is resistant to action of the electrolyte. Said plate may be of any electroconductive metal or alloy selected according to the electrolyte to be used. Then there is shown a metal screen 2, welded to said plate. A catalyst 3 has been pressed into the mesh of the screen.

The catalyst may be any of the known metal catalysts such as Pt, Au, Ir, Ni, Co, Fe, Pd, Os, Mn, Mo, Rh, a mixture of such metals or an alloy composed of such metals.

The catalysts may be prepared by grinding solid metal samples and then activating the thus ground metal, or the finely divided catalyst may be prepared in the active state by chemical reduction from solution. The chemical reduction could be performed by adding sodium borohydride or another known reducing agent to a solution of a salt of the metal to be used as a catalyst. If an alloy is desired, a solution of the salts of the metals to be allowed is prepared and sodium borohydride or hydrazine is added. Alloys such as Pt–Ir and Pt–Au are easily formed by this method. The alloy formation is disclosed in copending application S.N. 250,795 filed January 11, 1963, on even date herewith.

The invention will be more easily understood from the following examples which are for purposes of illustration only and should not be construed as limitations upon the true scope of the invention as set forth in the claims.

*Example I*

An 80 mesh tantalum screen is welded to a tantalum plate. An aqueous paste containing Pt–Ir alloy as the catalytic material is spread over the screen-plate assembly at a coverage rate of 7 mg./cm.$^2$. The solvent is evaporated from the paste. The assembly is placed in a press and subjected to a pressure of 1100 p.s.i.

*Example II*

An 80 mesh Pt screen welded to a Pt sheet had 8 gms./ft.$^2$ of Pt black in an $H_2O$ slurry applied to it. After partial drying, another Pt sheet was placed over this and the entire package subjected to 1000 p.s.i. The result after removal of the top Pt sheet was a stable, adherent coating of Pt black. The entire electrode then had the mechanical and catalytic properties of electrodeposited Pt black. The following table illustrates the performance of this electrode with 1 M $CH_3OH$ in 3.7 M $H_2SO_4$ at 60° C.

| Amps/ft.$^2$: | Volts polarization from theoretical $CH_3OH$ |
|---|---|
| 1 | 0.50 |
| 10 | 0.55 |
| 50 | 0.58 |
| 100 | 0.61 |

What is claimed is:
1. A non-porous electrode consisting of an electrically conductive metallic, solid base plate, a metal screen welded thereto and a finely divided metal catalyst pressed into the mesh of said screen, said base plate forming a continuous backing for said screen.
2. An electrode as in claim 1 wherein said base and said screen are platinum.
3. An electrode as in claim 1 wherein said catalyst is a Pt–Ir alloy.

References Cited by the Examiner

UNITED STATES PATENTS

| 409,365 | 8/1889 | Mond et al. | 136—86 |
| 782,308 | 2/1905 | Wright | 136—86 X |
| 2,526,657 | 10/1950 | Guyer | 252—477 |
| 2,639,306 | 5/1953 | Fischbach | 136—100 |
| 2,901,523 | 8/1959 | Justi et al. | 136—86 |

FOREIGN PATENTS

| 871,950 | 7/1961 | Great Britain. |

WINSTON A. DOUGLAS, *Primary Examiner.*
JOHN H. MACK, *Examiner.*
W. VAN SISE, A. SKAPARS, *Assistant Examiners.*